United States Patent [19]

Sugita et al.

[11] Patent Number: 4,974,970
[45] Date of Patent: Dec. 4, 1990

[54] HYDROSTATICALLY SUPPORTING DEVICE FOR SLIDE

[75] Inventors: Kazuhiko Sugita, Anjo; Kazuhisa Sugiyama, Okazaki; Yasumasa Nakane, Takahama, all of Japan

[73] Assignee: Toyoda Koki Kabushiki Kaisha, Kariya, Japan

[21] Appl. No.: 469,318

[22] Filed: Jan. 24, 1990

[30] Foreign Application Priority Data

Feb. 4, 1989 [JP] Japan ................................. 1-24776

[51] Int. Cl.⁵ ............................................. F16C 32/06
[52] U.S. Cl. ........................................ 384/12; 384/13
[58] Field of Search ............................ 384/12, 13, 100

[56] References Cited

U.S. PATENT DOCUMENTS

| 3,508,430 | 4/1970 | Edmondson | 384/12 |
| 4,465,325 | 8/1984 | Faure et al. | 384/12 |
| 4,630,942 | 12/1986 | Tsumaki et al. | 384/12 X |
| 4,865,465 | 9/1989 | Sugita et al. | 384/12 |

FOREIGN PATENT DOCUMENTS

| 13119 | 1/1984 | Japan | 384/12 |
| 13120 | 1/1984 | Japan | 384/12 |

Primary Examiner—Thomas R. Hannon
Attorney, Agent, or Firm—Oblon, Spivak, McClelland, Maier and Neustadt

[57] ABSTRACT

A hydrostatically supporting device for slide wherein a first slide member is provided with four guide surfaces constituting a square guide bore, and a second slide member having a square cross section is mated with the first slide member for sliding movements therebetween. Each of guide surfaces is provided with a pair of hydrostatic supporting surfaces formed at longitudinal ends of the guide surfaces, respectively, and each hydrostatic supporting surface is formed with a first hydrostatic pressure pocket formed at lateral center of the hydrostatic supporting surface and extending in the sliding direction. This first hydrostatic pressure pocket is provided with an oil supplying nozzle for supplying pressurized oil therethrough. Further, the hydrostatic supporting surface is provided with a pair of second hydrostatic pressure pockets each formed at opposite lateral ends of the hydrostatic supporting surface and extending in the sliding direction, and a pair of connecting grooves formed between the first and second hydrostatic pressure pockets for introducing the oil to the second hydrostatic pressure pockets.

4 Claims, 6 Drawing Sheets

FIG. I
(PRIOR ART)
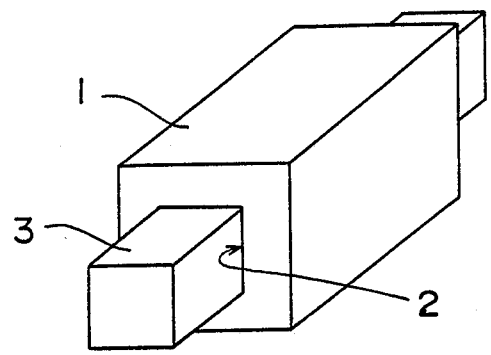
FIG. 2
(PRIOR ART)
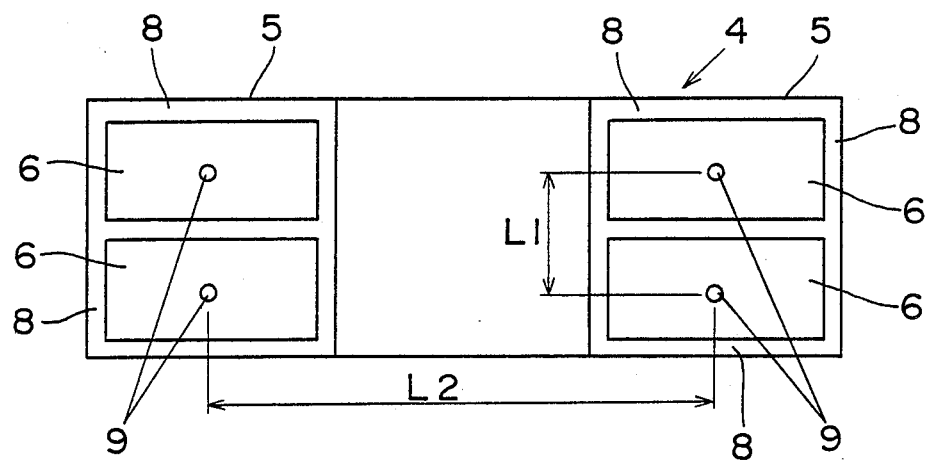

HYDROSTATICALLY SUPPORTING DEVICE FOR SLIDE

BACKGROUND OF THE INVENTION

1. Field of the Invention

The present invention relates to a device for hydrostatically supporting a slide. More particularly, it relates to such a device wherein a sliding movement is achieved between a first slide member having a square guide bore and a second square slide member guided by the square guide bore.

2. Description of the Prior Art

In the hydrostatic slide supporting device of this kind, a first slide member 1 is provided with a guide bore 2 having a square cross section, and a second slide member 3 having a square cross section is slidably guided by the guide bore 2, as shown in FIG. 1. In such device, a pair of hydrostatic supporting surfaces 5 are formed on each of four guide surfaces 4, which constitute the guide bore 2. The hydrostatic supporting surfaces 5 are formed at locations along the sliding direction, for example, formed at both longitudinal ends of the guide surfaces 4, as shown in FIG. 2, in order to restrict pitching movements of the second slide member 3, which is a swing movement about an axis perpendicular to the sliding direction.

Further, a pair of rectangular hydrostatic pressure pockets 6 are formed at each of the hydrostatic supporting surfaces 5 in order to restrict rolling movements of the second slide member 3, which is a swing movement about an axis parallel to the sliding direction. At each hydrostatic supporting surface 5, land portions 8 are formed to surround the hydrostatic pressure pockets 6, and a par of oil supplying nozzle 9 is disposed within each hydrostatic pressure pocket 6 in order to supply pressurized lubrication oil thereto.

When pressurized lubrication oil is supplied to the oil supplying nozzles 9, the lubrication oil flows into the hydrostatic pressure pockets 6 in order to produce a predetermined pressure in the hydrostatic pressure pockets 6, and then flows outside of the hydrostatic supporting surfaces 5 through a clearance between the land portions 8 and the outer surface of the second slide member 3.

When a pitching motion or a rolling motion of the second slide member 3 occurs, the pressures in some of the hydrostatic pressure pockets 6, which relatively approach to the outer surface of the second member 3, increase in order to return the second slide member 3 to the original posture.

In such device, the rolling motion of the second slide member 3 is restricted by the pair of hydrostatic pressure pockets 6 formed at each hydrostatic supporting surface 5, and the supporting strength changes in proportion to the square value of the distance L1 between the lateral centers of the pair of hydrostatic pressure pockets 6 along a direction perpendicular to the sliding direction.

On the other hand, the pitching movement of the second slide member 3 is restricted by each pair of hydrostatic supporting surfaces 5 formed on the guide surfaces 4, and the supporting strength changes in proportion to the square value of the distance L2 between the longitudinal centers of the hydrostatic supporting surfaces 5 along the sliding direction.

In such hydrostatically supporting device, however, the support strength against the rolling movements cannot increase so much, because the distance L1 is smaller than the half of the lateral width of the hydrostatic supporting surface 5.

Further, since the number of the oil supplying nozzles 9 increases in proportion to the increase of the hydrostatic pressure pockets 6 and the diameter of the nozzles 9 cannot be reduced so much because of machinability, the amount of the lubrication oil fed into the hydrostatic pressure pockets 6 is inevitably increased. Accordingly, the clearance between the land portions 8 and the outer surface of the second slide member 3 must be increased in order to allow the large amount of lubrication oil to flow outside the hydrostatic supporting surfaces 5. However, if the clearances between the land portions 8 and the outer surface of the second slide member 3 were increased, the supporting strength of the hydrostatically supporting device would be decreased.

Also, another type of hydrostatic supporting device is disclosed as a prior device in the Japanese unexamined patent application No. 59-13120. In this device, as shown in FIG. 3, a slider 12 is provided with sliding surfaces 14, whereat air pockets 15 extending along the sliding direction and plural T-shaped grooves 16 extending in lateral direction are formed. The grooves 16 are connected to the air pockets 15, and have a constant small depth to reduce the pressure of the air fed into the air pockets 15 gradually. Although this device has an advantage to reduce the number of nozzles, it is necessary to form a large number of T-shaped grooves 16 on the sliding surfaces 14, thereby the machining time of the device becoming long. Further, since no hydrostatic pressure pocket is formed at the lateral both ends of the sliding surface, it is difficult to increase the supporting strength against rolling motions.

SUMMARY OF THE INVENTION

Accordingly, it is an object of the present invention to provide a hydrostatic slide supporting device having higher supporting strength against rolling movements of a guided slide member.

Another object of the present invention is to provide a hydrostatic slide supporting device capable of increasing the supporting strength with relatively small number of pressure grooves.

Briefly, in a hydrostatic slide supporting device according to the present invention, a first slide member is provided with four guide surfaces, which constitute a square guide bore, and a second slide member having a square shape is inserted into the guide bore in order to realize sliding movements therebetween. Some of the guide surfaces are provided with plural hydrostatic supporting surfaces formed at locations along the sliding direction, and each hydrostatic supporting surface is provided with a first hydrostatic pressure pocket formed at about the lateral center of the supporting surface and extending in the sliding direction, and an oil supplying nozzle disposed within the first hydrostatic pressure pocket for supplying oil to the first hydrostatic pressure pocket. The hydrostatic supporting surface is further provided with a pair of second hydrostatic pressure pockets formed at locations near the both lateral ends of the supporting surface, and a pair of connecting grooves of small depth for connecting the pair of second hydrostatic pressure pockets and the first hydrostatic pressure pocket.

With this configuration, lubrication oil fed into the first hydrostatic pressure pockets through the oil supplying nozzles also flows to the pair of second hydrostatic pressure pockets, so that a predetermined pressure is generated in the second hydrostatic pressure pockets. Since the pair of second hydrostatic pressure pockets are formed at locations near the both lateral ends of the hydrostatic supporting surface, the distance between the lateral centers of the pair of second hydrostatic pressure pockets becomes larger, as compared with the known device, thereby the supporting strength against rolling movements being increased.

BRIEF DESCRIPTION OF THE ACCOMPANYING DRAWINGS

The foregoing and other objects, features and many of the attendant advantages of the present invention will be readily appreciated as the same becomes better understood by reference to the following detailed description of a preferred embodiment when considered in connection with the accompanying drawings, wherein like reference numerals designate identical or corresponding parts throughout the several views, and in which:

FIG. 1 is a perspective view of a slide mechanism employing a known hydrostatic slide supporting device;

FIG. 2 is a plan view of a guide surface of the known hydrostatic slide supporting device;

DETAILED DESCRIPTION OF THE PREFERRED EMBODIMENT

Figure 3:
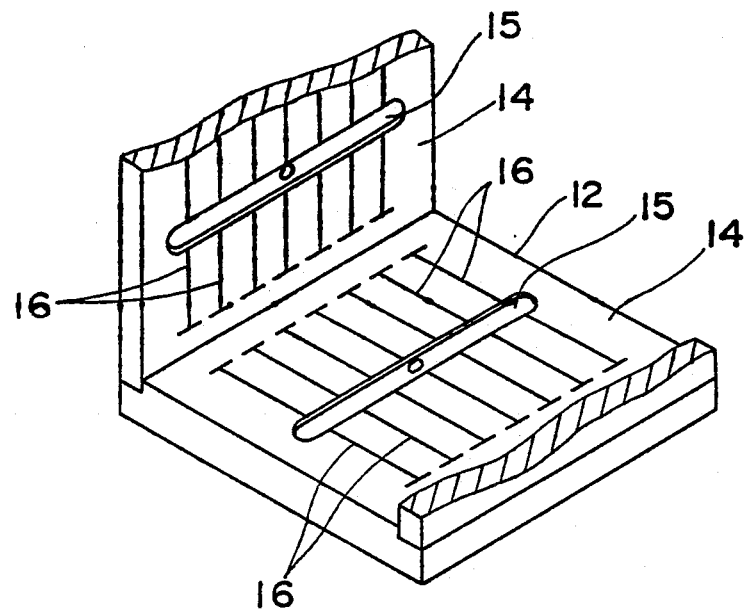
FIG. 3 is a perspective view of another known hydrostatic slide supporting device.
Figure 4:
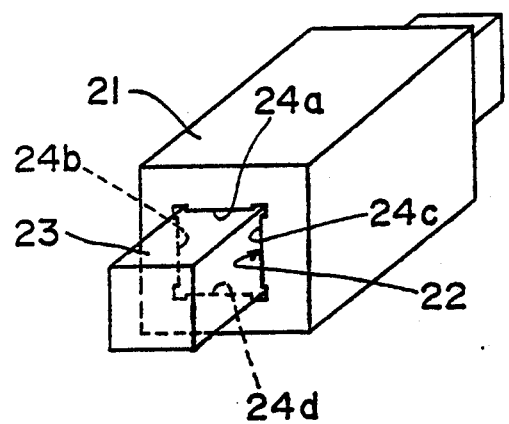
FIG. 4 is a perspective view of a slide mechanism employing a hydrostatic slide supporting device according to the present invention.

Referring now to the drawings and particularly, to FIG. 4 thereof, a female member 21, which is a first one of slide members sliding each other therebetween, is provided with a guide bore 22 having a square cross section, and a male member 23 having a square cross section, which is a second one of the slide members, is slidably inserted therethrough. One of the female member 21 and the male member 23 is fixed, for example, to a bed, and the other of them supports a movable element such as a tool supporting member, to which a cutting tool is fixed.

Figure 5:
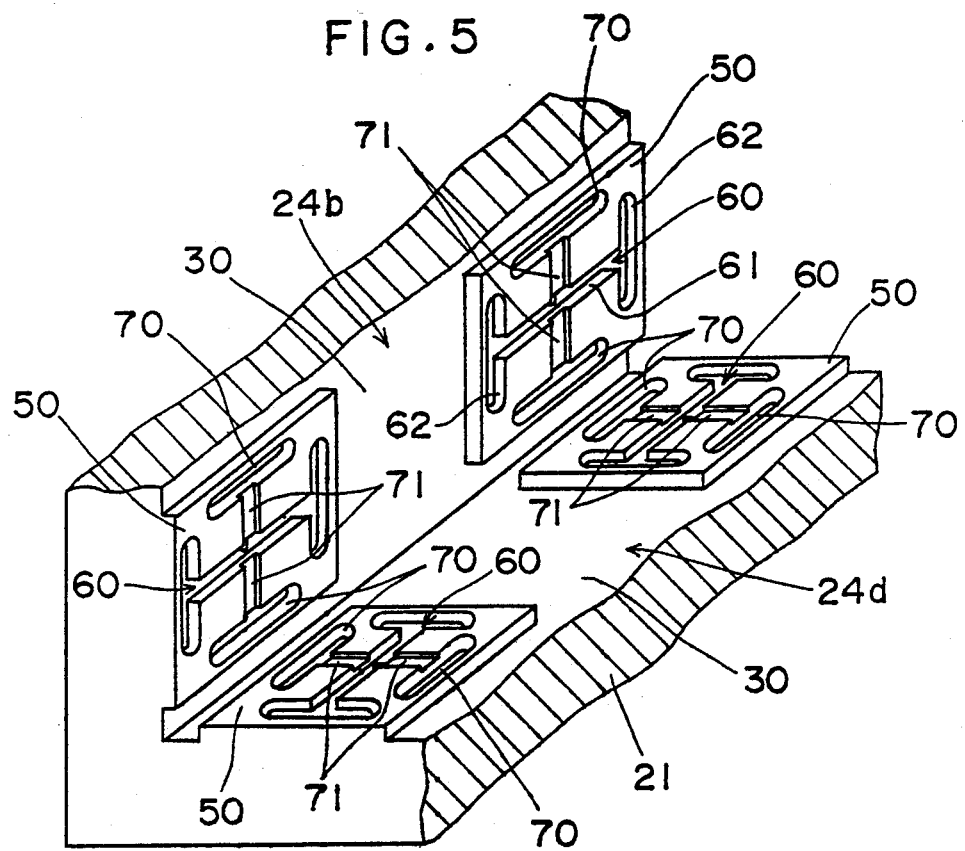
FIG. 5 is a partially cutaway view of the female member shown in FIG. 4.
Figure 6:
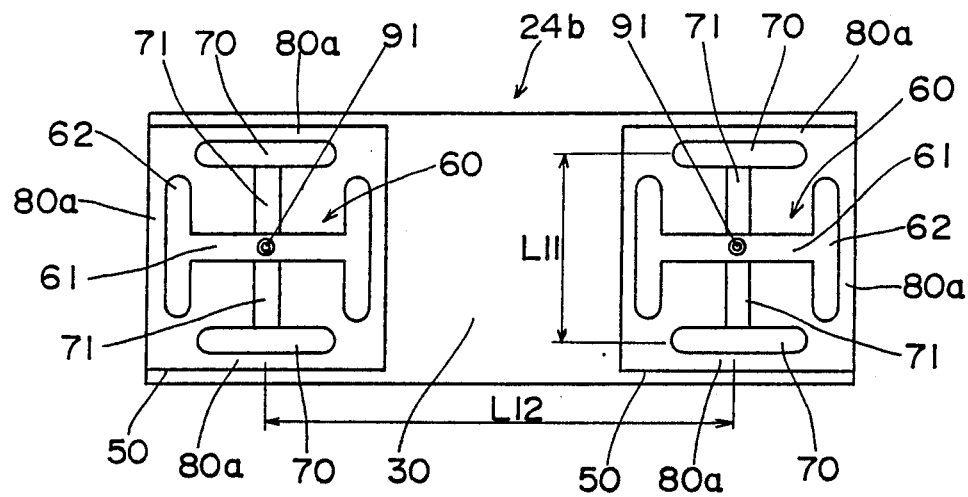
FIG. 6 is a plan view of one of the guide surfaces of the female member shown in FIG. 4.

The female member 21 is provided with a top guide surface 24a, a pair of side guide surfaces 24b, 24c and a bottom guide surface 24d to constitute the square guide bore 22, and all of the guide surfaces 24a, 24b, 24c, and 24d are provided with plural hydrostatic supporting surfaces 50 as shown in FIG. 5. FIG. 6 shows the side guide surface 24b, and a pair of hydrostatic supporting surfaces 50, whose lateral width are slightly narrower than that of the guide surface 24b, are formed at both longitudinal ends of the guide surface 24b, respectively. Other guide surfaces 24a, 24c, 24d also have the same hydrostatic supporting surfaces 50 at the same longitudinal locations. Although all of the guide surfaces 24a-24d are provided with the pair of hydrostatic supporting surfaces 50 in this embodiment, the hydrostatic supporting surfaces 50 may be omitted from the top guide surface 24a.

Figure 8:
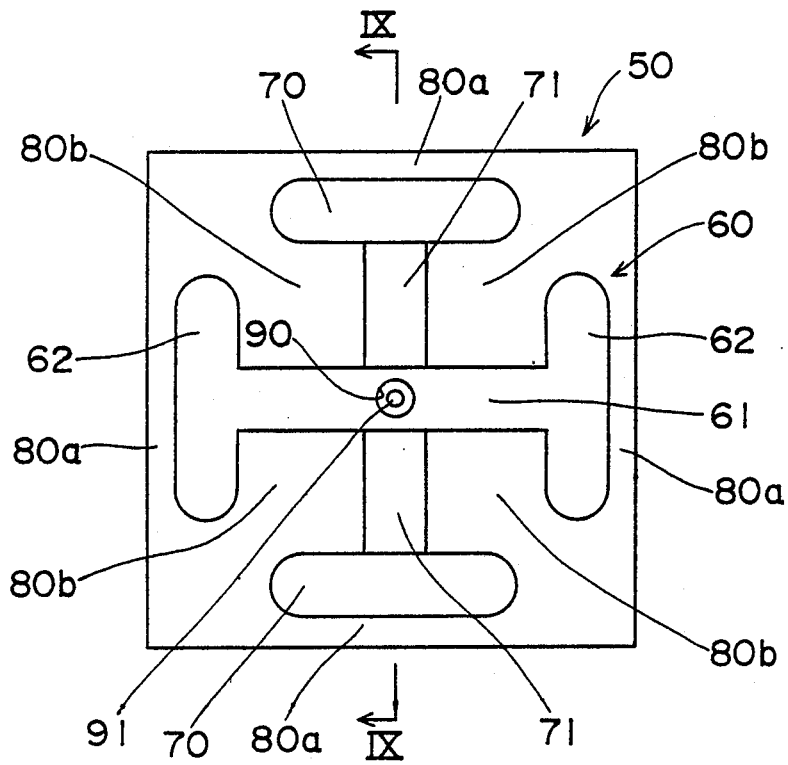
FIG. 8 is an enlarged plan view of one of the hydrostatic supporting surfaces shown in FIG. 6.

Each hydrostatic supporting surfaces 50 is provided with a first H-shaped hydrostatic pressure pocket 60, a pair of second hydrostatic pressure pockets 70 each extending in the sliding direction, and a pair of connecting grooves 71 connecting the first hydrostatic pressure pocket 60 and the second hydrostatic pressure pockets 70. As shown in FIG. 8, the first hydrostatic pressure pocket 60 is composed of a longitudinal groove 61 extending in the sliding direction and a pair of lateral grooves 62 continuously formed at both longitudinal ends of the longitudinal groove 61. The longitudinal groove 61 has a depth of a few millimeters, and the lateral grooves 62 have the same depth as that of the longitudinal groove 61. The lateral grooves 62 extend in a lateral direction perpendicular to the sliding direction.

On the other hand, the pair of second hydrostatic pressure grooves 70 are formed at locations close to both opposite lateral edges of the hydrostatic supporting surface 50, respectively. The pair of second hydrostatic pressure pockets 70 are connected at their longitudinal centers to one end of the connecting grooves 71 extending in the lateral direction, and the other ends of the connecting grooves 71 are connected to the longitudinal groove 61 of the first hydrostatic pressure pocket 60. The second hydrostatic pressure pockets 70 have a depth substantially equal to the depth of the first hydrostatic pressure pocket 60, and the connecting grooves 71 have a depth of several tens micron. Therefore, the connecting grooves 71 operate as throttle grooves. By forming these grooves, land portions 80a having a predetermined width are formed between the lateral grooves 62 and the longitudinal edges of the hydrostatic supporting surface 50, and between the second hydrostatic pressure pockets 70 and the lateral edges of the hydrostatic supporting surface 50. Also, land portions 80b are formed between the first hydrostatic pressure pockets 60 and the second hydrostatic pressure pockets 70. A numeral 30 in FIGS. 5 and 6 indicates a depressed portion formed between the pair of hydrostatic supporting surfaces 50.

Figure 7:
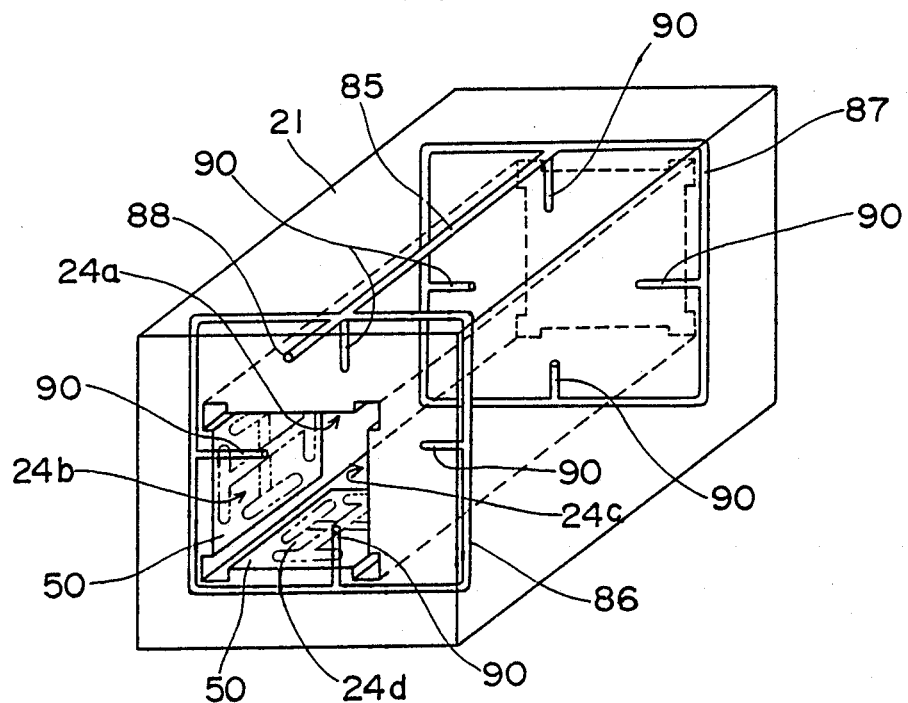
FIG. 7 is a perspective view of the female member showing oil supplying passages formed therein.
Figure 9:
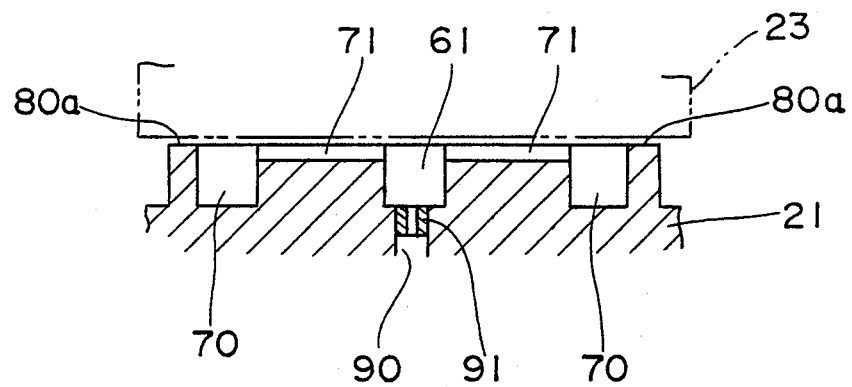
FIG. 9 is a cross sectional view taken along the line IX—IX in FIG. 8.

Further, oil supplying passage 85, 86 and 87 are formed within the female member 21, as shown in FIG. 7, in order to lead pressurized lubrication oil supplied to an inlet port 88 to plural supplying passages 90 each opened to respective longitudinal grooves 61 at their longitudinal centers. Furthermore, a nozzle 91 is fixed to the outer end of each supplying passage 90, as shown in FIG. 9, to reduce the pressure of the supplied lubrication oil to a predetermined value.

The operation of the hydrostatic supporting device will now be explained.

When lubrication oil is fed from an oil source (not shown) to the inlet port 88, the lubrication oil flows to plural supplying passages 90 through the oil supplying passages 85, 86 and 87 in order to be fed into respective first hydrostatic pressure pockets 60 through the nozzles 91, whereat the pressure of the lubrication oil is reduced in order to produce a predetermined pressure in the first hydrostatic pressure pockets 60. The lubrication oil then flows to the second hydrostatic pressure pockets 70 through the connecting grooves 71 in order to produce a predetermined pressure in the second hydrostatic pressure pockets 70. After that, the lubrication oil flows outside of the hydrostatic supporting surfaces 50 through the land portions 80a.

Figure 10:
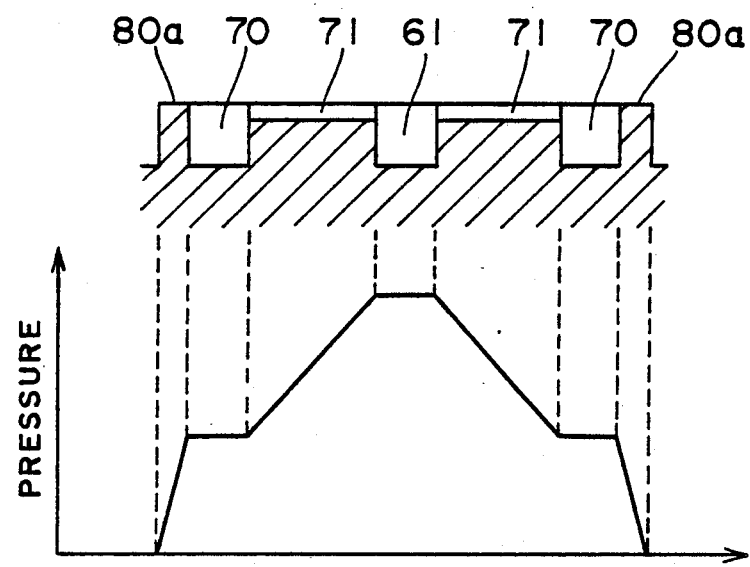
FIG. 10 is a graph showing the change of the pressure in one of the hydrostatic supporting surfaces.

The pressure of the lubrication oil is gradually reduced as shown in FIG. 10 in order to produce required pressures at both the first and second pressure pockets 60 and 70, respectively. Since the lubrication oil also flows from the longitudinal grooves 61 of the first hydrostatic pressure pockets 60 to the second hydrostatic pressure pockets 70 through land portions 80b, pressures are also generated at the land portions 80b, and the pressures are gradually decreased in the course of the flow. Since the lubrication oil is fed to the nozzles 90 of all hydrostatic supporting surfaces 50, substantially same pressures are produced at all of the hydrostatic supporting surfaces 50 formed on the guide surfaces 24a–24d.

When a rolling motion is produced during a sliding movement, the generated pressures increase at some second hydrostatic pressure pockets, which approach relative to the outer surface of the male member 23, are increased, so that a force is produced to return the male member 23 to the original posture. Since the support strength against such rolling movement is proportional to the square of the distance L11 between the lateral centers of the pair of second hydrostatic pressure pockets 70, and the distance L11 is close to the width of the hydrostatic supporting surface 50, a high supporting strength against rolling motion can be obtained.

When a pitching motion is produced during a slide movement, the pressures generated at some of the hydrostatic supporting surfaces 50 which approach relative to the outer surface of the male member 23, are increased, so that a force is produced to return the male member 23 to the original posture. The support strength against such pitching movement is proportional to the square of the distance L12 between the longitudinal centers of each pair of hydrostatic supporting surfaces 50.

Although the first hydrostatic pressure pocket 60 is composed of a longitudinal groove 61 extending in the sliding direction and a pair of lateral grooves 62, the lateral grooves 62 may be omitted.

Obviously, numerous modifications and variations of the present invention are possible in light of the above teachings. It is therefore to be understood that within the scope of the appended claims, the present invention may be practiced otherwise than as specifically described herein.

What is claimed is:

1. A hydrostatic slide supporting device comprising;
    a first slide member provided with four guide surfaces constituting a guide bore having a square cross section;
    a second slide member having a square cross section and slidably guided by said guide bore of said first member; and
    plural hydrostatic supporting surfaces formed at at least one of said guide surface;
    each of said hydrostatic supporting surface being provided with;
    a first hydrostatic pressure pocket formed at about lateral center of said hydrostatic supporting surface and extending in the sliding direction of one of said first and second members;
    a pair of second hydrostatic pressure pockets formed at locations each close to opposite lateral edges of said hydrostatic supporting surface and extending in said sliding direction;
    a pair of connecting groove formed between said first and second hydrostatic pressure pockets in order to connect said first and second hydrostatic pressure pockets, said connecting grooves having a smaller depth than those of said first and second hydrostatic pressure pockets in order to operate as throttle grooves; and
    a nozzle provided in said first hydrostatic pressure pocket for supplying pressurized fluid to said first hydrostatic pressure pocket.

2. A hydrostatic slide supporting device as set forth in claim 1, wherein said first hydrostatic pressure pocket is composed of a longitudinal groove extending in said sliding direction, and a pair of lateral grooves continuously formed at both longitudinal ends of said longitudinal groove and extending in a lateral direction perpendicular to said sliding direction.

3. A hydrostatic slide supporting device as set forth in claim 2, wherein said plural hydrostatic supporting surfaces are a pair of hydrostatic supporting surfaces formed at both longitudinal ends of said guide surface, respectively.

4. A hydrostatic slide supporting device as set forth in claim 3, wherein said pair of hydrostatic supporting surfaces are formed on all of said four guide surfaces.

* * * * *